Oct. 19, 1937.   C. F. OESTERMEYER   2,096,131
ELECTRICAL CHECK EQUIPMENT
Filed Oct. 24, 1935   3 Sheets-Sheet 1

INVENTOR.
CARL F. OESTERMEYER
BY Kwis, Hudson & Kent
ATTORNEYS.

Oct. 19, 1937.  C. F. OESTERMEYER  2,096,131
ELECTRICAL CHECK EQUIPMENT
Filed Oct. 24, 1935  3 Sheets-Sheet 3

INVENTOR.
CARL F. OESTERMEYER
BY Kwis, Hudson & Kent
ATTORNEYS.

Patented Oct. 19, 1937

2,096,131

UNITED STATES PATENT OFFICE 2,096,131

ELECTRICAL CHECK EQUIPMENT

Carl F. Oestermeyer, Shaker Heights, Ohio, assignor to Willard Storage Battery Company, Cleveland, Ohio, a corporation of West Virginia Application October 24, 1935, Serial No. 46,546

6 Claims. (Cl. 175—183)

This invention relates to improvements in electrical check equipment, that is to say, testers for various circuits and pieces of apparatus in the electrical system of a motor vehicle.

One of the objects of the invention is the provision of an electrical check equipment which shall be complete and yet simple and relatively inexpensive.

Another object is the provision of an equipment of this character which shall be capable of quick attachment to the battery and other parts of an automobile electrical system, and comprising a simple manual control for putting the apparatus into condition for taking the desired readings one after another.

Another object is the provision of means for taking the voltages of the different cells of a multi-cell battery from a single voltmeter and without changing the conductor connections from the battery to the test equipment.

A further object is the provision of a double range voltmeter arranged for selective operation under the said manual control, so that relatively fine readings may be obtained for the low voltage range.

Still another object is the provision of equipment by means of which the functioning of the output regulation of an automobile generator may be checked, that is to say, when the automobile equipment includes provision for maintaining the voltage of the generator substantially constant.

Figure 1:
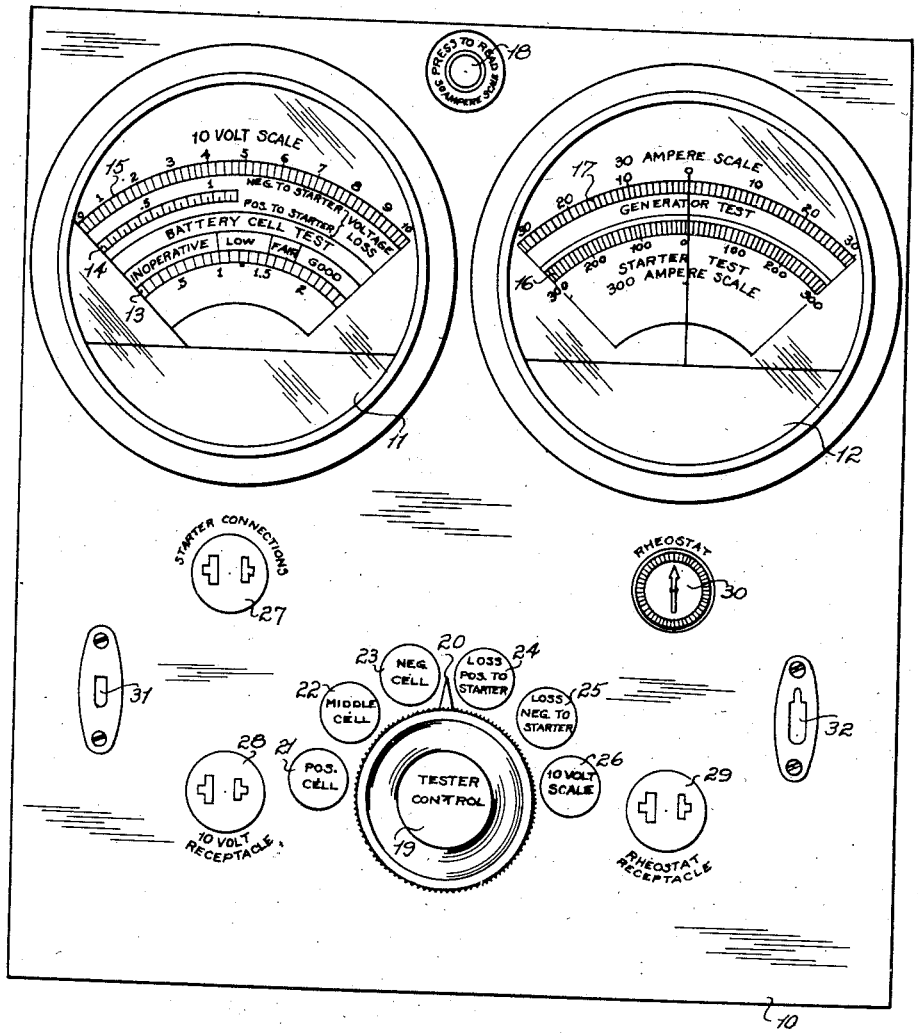
Figure 2:
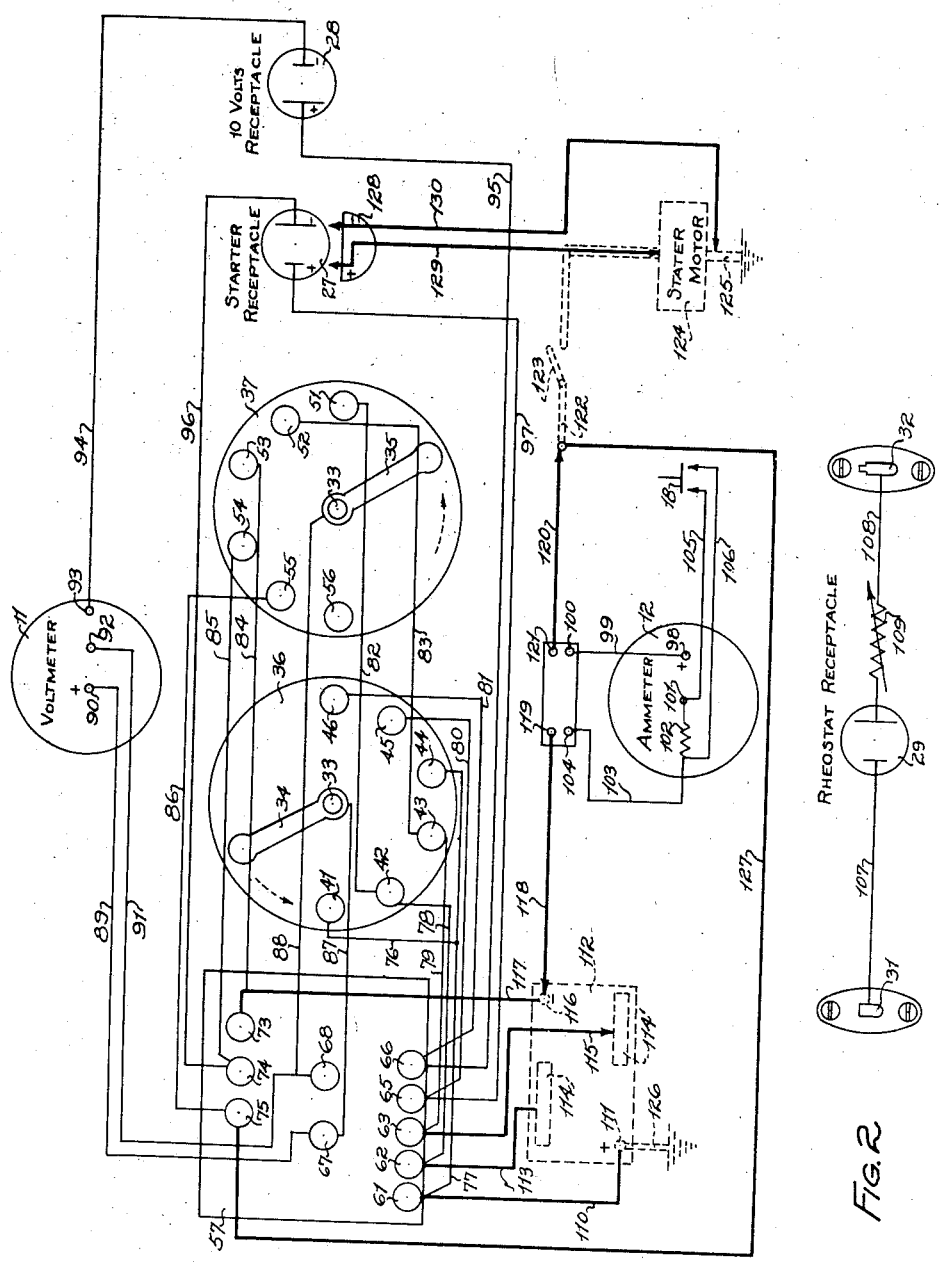
Figure 3:
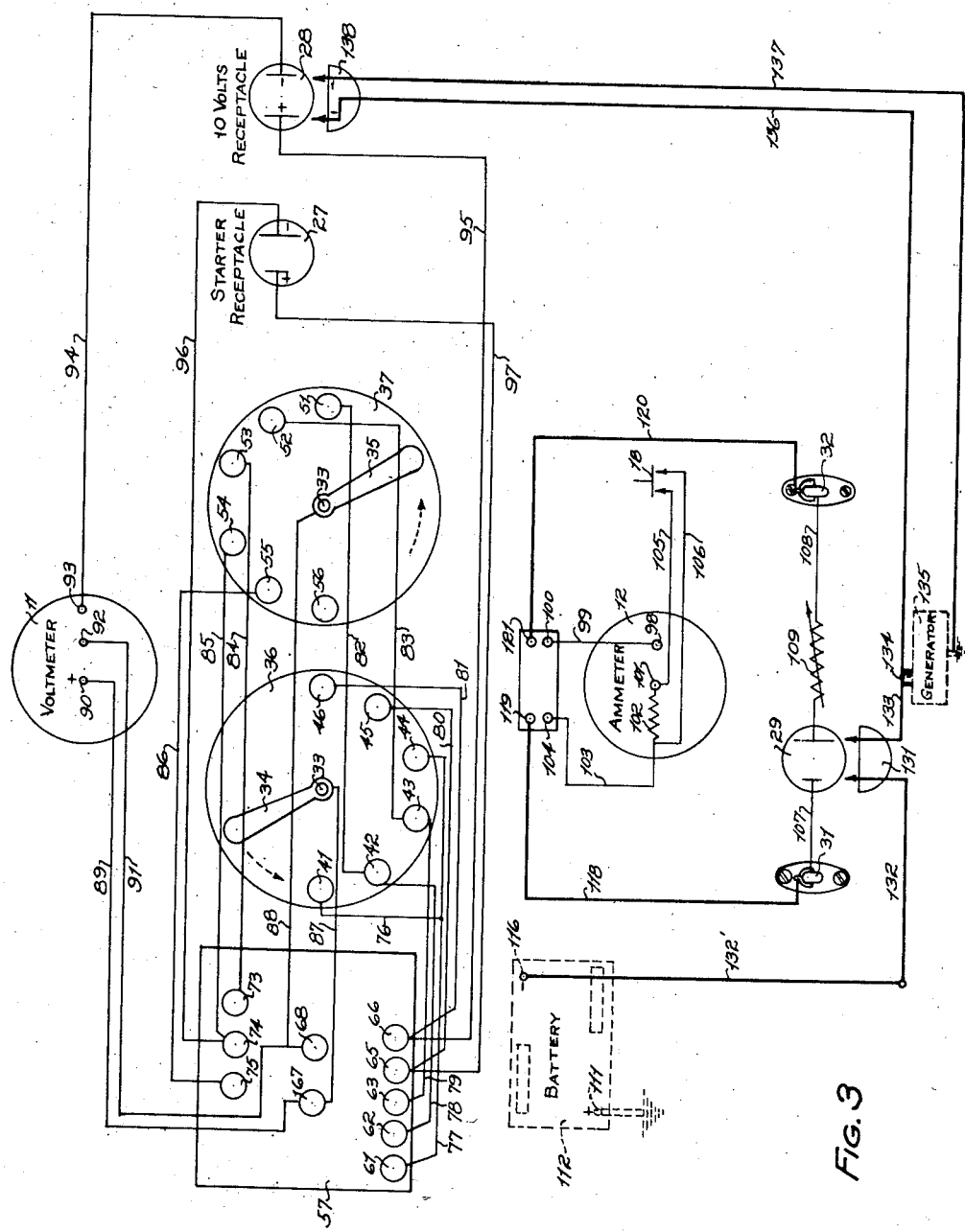

Other objects and features of novelty will appear as I proceed with the description of that embodiment of the invention which, for the purposes of the present application, I have illustrated in the accompanying drawings, in which Fig. 1 is a face view of an instrument board which may be used in connection with the invention;

Fig. 2 is a wiring diagram showing the equipment set up for checking the cell voltages of a battery, for checking the load imposed upon the battery by the starting motor, and for checking the voltage loss in the motor conductors; and Fig. 3 is a wiring diagram showing the equipment set up for checking the charging rate of a generator and the automatic regulation thereof.

In Fig. 1 of the drawings I have shown an instrument panel 10 which preferably forms a cover for a box, not shown, in which the greater part of the apparatus is contained. A two-range voltmeter 11 and a two-range ammeter 12 are mounted on the panel 10. On the face of the voltmeter there is inscribed a scale 13 entitled "Battery cell test" with a high reading of 2½ volts, this scale being divided up into headings "Inoperative", "Low", "Fair", and "Good", which are placed there particularly for the information of owners whose batteries are being tested. Above the scale 13 there is another scale 14 running up to 1.2 volts, the divisions of which correspond with those on a portion of the lower scale 13. The scale 14 is used for measuring the voltage loss between the battery and the starting motor on either side of the battery when the starting motor is in operation. These two scales cover the lower range of the voltmeter. For the upper range of the voltmeter there is a scale 15 running from zero to 10 volts. This scale is marked on the face of the meter "10 Volt scale."

The ammeter 12 has a lower scale 16 running from zero to 300 amperes in either direction, this scale being marked on the meter face "Starter test 300 ampere scale." This scale and this range of the meter are used only for the measurement of the "starter draw", that is the current used in operating the starting motor. On the same meter face there is a second scale 17 running from zero to 30 amperes in either direction and labeled "30 Ampere scale, generator test." At the top of the panel there is a push-button 18 which serves when pressed to remove from the ammeter circuit sufficient resistance to give the readings on the low range scale 17. By the use of a push-button switch for this purpose, I guard against the accidental use of the ammeter without this resistance when a heavy starting current is flowing. The details of this arrangement will appear in the description of the wiring diagrams to follow.

On the lower part of the panel 10 there is a "tester control" knob 19 having a pointer 20. This control knob has six operating positions 21 to 26 inclusive. When the pointer 20 is turned to one of the three positions 21, 22, and 23, the voltmeter 11 is in communication with one of the three cells of the battery being tested, as indicated by the markings on Fig. 1. When the pointer is turned to one of the positions 24 and 25, connections are made for measurement of the voltage loss between the battery and the starting motor on either side of the battery, as indicated by the inscriptions on Fig. 1. When the pointer is turned to position 26, certain connections are made to shift from the low range of the voltmeter to the 10 volt range, as will appear presently.

27, 28, and 29 are polarized receptacles adapted to receive polarized plugs on the ends of cord sets, by means of which connection may be made with pieces of apparatus inside or outside of the testing equipment, as will presently appear. 30 is a rheostat control knob by means of which a variable resistance may be introduced into the ammeter circuit. 31 and 32 are terminal posts which are adapted to receive special connecters on one of the cord sets, these posts having internal connections with the two sides of the rheostat receptacle 29.

Referring now to Figs. 2 and 3, 33 indicates a shaft which projects through the panel 10 and is adapted to be rotated by the knob 19, being pinned or otherwise secured thereto. This shaft has keyed thereto at spaced points along its length a pair of similar switch arms 34 and 35, these arms being insulated from each other. 36 and 37 are insulation plates upon which are mounted at evenly spaced intervals contact buttons 41 to 46 inclusive and 51 to 56 inclusive, respectively. In the box beneath the panel 10 there is an insulation board 57 upon which are carried binding posts 61, 62, 63, 65, 66, 67, 68, 73, 74, and 75.

Button 41 is connected with binding post 61 by conductors 76 and 77. Buttons 42 and 43 are connected with binding posts 62 and 63 by conductors 78 and 79 respectively. Button 44 is connected with binding post 61 by conductor 77. Buttons 45 and 46 are connected with binding posts 65 and 66 by conductors 80 and 81. Buttons 51 and 52 are connected with buttons 42 and 43 by conductors 82 and 83 respectively. Buttons 53, 54, and 55 are connected with binding posts 73, 74, and 75 respectively by conductors 84, 85, and 86.

The switch arms 34 and 35 are connected with binding posts 67 and 68 by conductors 87 and 88 respectively. Binding post 67 is also connected by a conductor 89 to one terminal 90 of the voltmeter 11. The binding post 68 is connected by a conductor 91 with another terminal 92 of the voltmeter. When connections are made to the voltmeter between terminals 90 and 92, the readings are on the 2.5 volt scales 13 and 14. A third terminal 93 of the voltmeter is connected by a conductor 94 with one side of the receptacle 28. A conductor 95 leads from the other side of that receptacle to the binding post 66. From one side of the receptacle 27 a conductor 96 leads to binding post 74, while the other side of the receptacle is connected by a conductor 97 with the binding post 65.

On the ammeter 12 there is a terminal 98 which is connected by a conductor 99 with a contact 100 in an ammeter shunt box. Another terminal 101 of the ammeter is normally connected through a resistance 102 and a conductor 103 with a contact 104 of the shunt box. When the resistance 102 is in the meter circuit, as it is normally, the meter registers on the 300 ampere scale 16. This resistance may be shunted out, however, through conductors 105 and 106 when push-button 18 is depressed, and then the meter registers on the 30 ampere scale 17.

Within the box which houses the equipment the contact post 31 is connected by a conductor 107 with one side of the polarized receptacle 29. The other side of that receptacle is connected through a conductor 108 and variable resistance 109 with contact post 32. Resistance 109 is adjusted by means of rheostat knob 30.

I will now describe those connections which are external portions of the equipment, that is, those which extend outside of the box upon which the panel 10 is mounted, it being understood that this box is preferably mounted upon a wheeled carriage which supports the box at a convenient elevation and enables it to be moved readily so that it may be placed adjacent an automobile on either side thereof or moved from one side to the other, as may be required.

The outside flexible conductors are indicated in the wiring diagrams by heavy lines. As shown in Fig. 2, a conductor 110 attached to binding post 61 is detachably connected to the positive terminal post 111 of a three-cell storage battery 112 such as is ordinarily employed in an automobile. Another conductor 113 attached to binding post 62 is provided with means for detachable connection with an inter-cell connector 114 joining the positive cell of the battery to the intermediate cell. Another inter-cell connector 114', joining the intermediate cell and the negative cell, is connected detachably by a flexible cord 115 with the binding post 63, while the negative terminal 116 of the battery is adapted to be joined with binding post 73 by a flexible conductor 117.

A flexible conductor 118 leading from a terminal 119 in the ammeter shunt box is adapted to be clamped upon negative terminal 116 of the battery, and another flexible conductor 120 leads from another terminal 121 in the shunt box and is adapted to be clamped onto the extremity of the starting motor cable 122 when the latter has been removed from the negative post 116 of the battery. 123 represents the starting switch, and 124 indicates the starting motor which may be grounded through a cable 125. The positive terminal of the battery is also grounded through a cable 126. From the extremity of conductor 120 there extends another conductor 127 which runs back to binding post 75.

A polarized plug 128 adapted to be received in receptacle 27 carries projecting contacts that are joined electrically with conductors 129 and 130 respectively. These conductors may be detachably connected with the opposite terminals of the starting motor 124, as indicated in Fig. 2.

At certain times the conductors 118 and 120 are connected with posts 31 and 32, respectively, as indicated in Fig. 3. At such times, polarized plug 131 is mounted in receptacle 29. The regular battery cable 132' is disconnected from the generator and its free end connected with one of the conductors 132 of the cord set attached to plug 131. The other conductor 133 from plug 131 is connected with the terminal 134 of the automobile generator 135 to be tested. At the same time, conductors 136 and 137, which are attached to a polarized plug 138 which is inserted in the receptacle 28, are connected to the terminal 134 and to the ground on the other side of the generator respectively. It will be understood that the free ends of the various flexible cords above referred to are provided with suitable means, such as spring grip connecters, for conveniently and quickly making the connections with the electrical apparatus of the vehicle. When the connections shown in Fig. 2 have been made, the operator is in readiness to make various tests by the simple expedient of turning the control knob 19 and taking readings from the voltmeter 11 and the ammeter 12.

*Checking battery cell voltage.*—It will be apparent that the positive cell of battery 112 is connected between conductors 110 and 113. The operator turns knob 19 until pointer 20 stands over position 21 on the panel 10, when arms 34 and 35, which are mechanically united and electrically insulated from each other, will engage contact buttons 41 and 51 respectively. Current will then flow from positive terminal post 111 of the battery through the positive cell thereof to the connecter 114, thence through conductor 113 to binding post 62, through conductor 78 to contact button 42, thence through conductor 82 to contact button 51, through switch arm 35 and conductor 88 to binding post 68, thence through conductor 91 to voltmeter terminal 92, through the voltmeter to terminal 90, and back through conductor 89, binding post 67, conductor 87, switch arm 34, contact button 41, conductors 76 and 77 to binding post 61, and thence through conductor 110 to battery terminal post 111. The reading on the voltmeter is then taken, after which the knob 119 is turned to bring pointer 20 to the position 22, when the arms 34 and 35 will come to rest on contact buttons 42 and 52 respectively. The current now flows through the intermediate cell from connecter 114 to connecter 114', and from the latter connecter through conductor 115 to binding post 63, conductor 79, contact button 43, conductor 83, contact button 52, switch arm 35, conductor 88, binding post 68, conductor 91, terminal 92 of the voltmeter, through the voltmeter to terminal 90, returning through conductor 89, binding post 67, conductor 87, switch arm 34, contact button 42, conductor 78, binding post 62, and conductor 113 back to the battery. The voltage of the intermediate cell is thus registered on the voltmeter.

Next the operator turns knob 19 to position 23, bringing the mechanically united arms 34 and 35 into engagement with contact buttons 43 and 53 respectively. Current then flows through the negative cell of the battery from connecter 114' to terminal post 116, and from that post through conductor 117 to binding post 73, through condutor 84 to contact button 53, through switch arm 35 and conductor 88 to binding post 68, to the voltmeter by way of conductor 91, and back through conductor 89 to binding post 67 and by way of conductor 87 and switch arm 34 to contact button 43, through conductor 79 to binding post 63, and by way of conductor 115 back to the battery. The voltage of the negative cell may then be read on the voltmeter.

These three readings are of course obtained very quickly and without any change whatever in the electrical connections other than those effected by the turning of knob 19. These cell voltages are taken preferably under full load, that is, while the starting motor is running and the engine ignition turned off.

*Voltage loss in battery to starter connections.—* Next the operator turns knob 19 to the fourth position marked 24 on Fig. 1. This brings arms 34 and 35 into engagement with contact buttons 44 and 54 respectively. With the starter switch 123 closed, current flows from the starting motor through cable 125 to ground, thence from ground through cable 126 to positive post 111 of the battery, through conductor 110 to binding post 61, thence through conductor 77 to contact button 44, switch arm 34, conductor 87, binding post 67, conductor 89 to voltmeter 11, and back through conductor 91 to binding post 68, conductor 88 to switch arm 35, through contact button 54 and conductor 85 to binding post 74, through conductor 96 to receptacle 27, and through plug 128 and conductor 130 back to cable 125. This measures the voltage drop of the connections on the positive side of the battery extending to the starting motor.

Having made a note of this voltage drop, the operator next turns knob 19 to the fifth position, marked 25 on the drawings, where the switch arms contact with the buttons 45 and 55. A circuit is then completed from the cable 122 through conductor 129, plug 128, receptacle 27, conductor 97, binding post 65, conductor 80, contact button 45, switch arm 34, conductor 87, binding post 67 and conductor 89 to the voltmeter, and back through conductor 91, binding post 68, conductor 88, switch arm 35, contact button 55, conductor 86, binding post 75, and conductor 127 to the cable 122. In other words, the voltmeter is bridged across the ends of cable 122 while it forms a part of the starting motor circuit. The voltage loss reading for this part of the circuit is now taken from the voltmeter. The allowable voltage losses for these connections may be learned from prepared tables listing various makes and models of automotive vehicles. Obviously, if the readings are too high, the condition of the conductors should be checked and corrected by repair or replacement of defective parts.

*Testing lamps and other accessories.—* Whenever it is desired to check lamps and various other electrical equipment of an automobile, the ammeter is connected across the terminals of the battery, as by connecting conductor 118 to battery post 116, as shown in Fig. 2, and connecting the outer extremity of conductor 120 to the ground. The operator may then turn on all of the normal driving lamps and check this normal lamp load on the 30 ampere scale 17 by depressing the push-button 18. He may then turn on all lamps and all electrical accessories, except such as draw a heavy current momentarily, and check this total load by a reading of the 30 ampere scale. Also the various lamps and accessories may be checked individually for current consumption by turning them on one at a time and depressing the push-button 18.

*Testing generator and generator regulator.—* When it is desired to test the generator and make a check of any automatic output control which may be provided, the control knob 19 is turned to the position marked 26 on the panel and the flexible cord connections illustrated in Fig. 3 are used. Current is then free to pass from generator 135 through ground to positive terminal 111 of the battery, through the battery and out through terminal 116, conductors 132' and 132, plug 131, receptacle 29, conductor 107, contact post 31, conductor 118, terminals 119 and 121, conductor 120, contact post 32, conductor 108, variable resistance 109, receptacle 28, plug 131, and conductor 133 back to the generator. With the engine running, and with no lamp or accessory load, the maximum charging rate may then be read on the 30 ampere scale by depressing the push-button 18. To obtain this reading, the engine speed should be increased slowly until the ammeter needle reaches the maximum value. The maximum charging rate under full load is then taken in a similar manner after turning on the lamps and other accessories.

With respect to the voltmeter, a shunt circuit may be traced from the generator through conductor 136, plug 138, receptacle 28, conductor 95, binding post 66, conductor 81, contact button 46, switch arm 34, conductor 87, binding post 67, and conductor 89 to terminal 90 of the voltmeter, through the voltmeter to terminal 93 and back through conductor 94, receptacle 28, plug 138, and conductor 137 to the opposite side of the generator. The voltage is read, of course, on the 10 volt scale 15.

Now, assuming that there is an automatic regulator in the electrical system of the automobile being checked, such regulator tending to maintain a predetermined potential across the brushes of the generator, and assuming that it is desired to check the operation of such regulator, and further assuming that the connections have been made as in Fig. 3, the operator starts the engine and takes readings of the voltmeter on the 10 volt scale 15, and of the ammeter with the push-button 18 depressed. Any variation in voltage may be noted as the engine speed is increased so as to check the operation of the regulator. The functioning of the regulator is affected by the condition of the battery, that is to say, due to the condition of the battery it may not be possible to obtain a voltage as high as the voltage specified for correct operation of the regulator relay. In order to meet this situation, I provide the variable resistance 109 which enables the operator to introduce resistance into the generator circuit, thereby increasing the voltage sufficiently to permit the desired test to be made.

Having thus described my invention, I claim:

1. In a system of the class described, a battery and a starting motor, means for measuring the voltage loss in the line between the battery and the motor on the positive side and the negative side separately, and means under a single manual control for connecting either side of said line to said voltage measuring means selectively.

2. In testing equipment of the character described, a voltmeter, detachable connections adapted to connect the various cells of a battery one at a time with the voltmeter, a detachable connection adapted to be connected with the starting motor of a vehicle, a detachable connection adapted to be connected with the generator of the vehicle, and a common control means for bringing into operative relation selectively any one of the sets of connections for said battery cells, or the connections for the starting motor, or the connections for the generator.

3. In testing equipment of the character described, an ammeter, a circuit therefor, a variable resistance in said circuit, and means for connecting a generator and a battery into the circuit, whereby the voltage of the generator may be varied during a test so as to cause a voltage regulator to function, the readings on the voltmeter and the ammeter at the time indicating the circuit condition at which the voltage regulator functions.

4. In apparatus for testing the electrical equipment of a motor vehicle including a storage battery and a generator, a voltmeter having low and high ranges, detachable connections adapted to connect the various cells of the battery one at a time with the low range of the voltmeter, means for connecting the opposite sides of the generator with the high range of the voltmeter, and means actuated by a single control for selectively connecting with the voltmeter said high range connections or any one of said low range connections.

5. In apparatus for testing the electrical equipment of a motor vehicle including a storage battery and a starter motor, a voltmeter, detachable connections adapted to connect the various cells of the battery one at a time with said voltmeter, detachable connections from the voltmeter adapted for attachment to spaced points on the positive and the negative sides of the line between the battery and the starter, and means actuated by a single manual control for selecting and rendering operative any one of said individual cell connections or either one of said connections to the starter line.

6. In apparatus for testing the electrical equipment of a motor vehicle including a storage battery, a starter motor and a generator, a voltmeter having low and high ranges, detachable connections from the low range of the voltmeter adapted for attachment to spaced points on the positive and the negative sides of the line between the battery and the starter, means for connecting the opposite sides of the generator with the high range of the voltmeter, and means actuated by a single manual control for selecting and rendering operative either one of said low range connections to the starter line or said high range connection to the generator.

CARL F. OESTERMEYER.